United States Patent
Makarov

(10) Patent No.: US 12,049,046 B2
(45) Date of Patent: Jul. 30, 2024

(54) METHOD OF OBTAINING PARALLEL-PERPENDICULAR SPHERICAL SYSTEM OF PLANES

(71) Applicant: Ivan Aleksandrovich Makarov, St. Petersburg (RU)

(72) Inventor: Ivan Aleksandrovich Makarov, St. Petersburg (RU)

( * ) Notice: Subject to any disclaimer, the term of this patent is extended or adjusted under 35 U.S.C. 154(b) by 702 days.

(21) Appl. No.: 17/053,575

(22) PCT Filed: Jun. 9, 2018

(86) PCT No.: PCT/RU2018/000390
§ 371 (c)(1),
(2) Date: Nov. 6, 2020

(87) PCT Pub. No.: WO2019/235959
PCT Pub. Date: Dec. 12, 2019

(65) Prior Publication Data
US 2021/0252799 A1  Aug. 19, 2021

(51) Int. Cl.
*B29C 65/00* (2006.01)
*B29C 65/48* (2006.01)
(Continued)

(52) U.S. Cl.
CPC ............ *B29C 65/48* (2013.01); *E04B 1/3211* (2013.01); *B29C 65/00* (2013.01); *B29C 65/02* (2013.01);
(Continued)

(58) Field of Classification Search
CPC .......... B29C 65/00; B29C 65/02; B29C 65/48
See application file for complete search history.

(56) References Cited

U.S. PATENT DOCUMENTS

| | | | |
|---|---|---|---|
| 4,165,355 A * | 8/1979 | Vasilos | C04B 35/597 |
| | | | 264/261 |
| 5,228,481 A | 7/1993 | Kimbara et al. | |

(Continued)

FOREIGN PATENT DOCUMENTS

| | | |
|---|---|---|
| RU | 2 229 561 | 5/2004 |
| RU | 2011 130 059 | 2/2013 |
| WO | 2008/066225 | 6/2008 |

OTHER PUBLICATIONS

International Search Report for PCT/RU2018/000390 dated Feb. 7, 2019, 3 pages.

(Continued)

*Primary Examiner* — Philip C Tucker
*Assistant Examiner* — Nickolas R Harm
(74) *Attorney, Agent, or Firm* — Boyle Fredrickson, SC

(57) ABSTRACT

The invention relates to methods for producing parallel-perpendicular spherical systems and can be used to assemble structures in engineering, construction or other arts. The method comprises the following operations: first, selecting of at least three identical elements; determining of at least one connection point on the first element; at least, determining of the connection point on the second element; connecting of the elements at certain points of the junction in such a way that the planes passing through the first element and the second element are perpendicular; selecting of the next element; determining of its points of intersection with first and second elements; connecting of the element with the first and second elements at the intersection points in such a way that the planes passing through the elements are mutually perpendicular, wherein meeting of the condition that the first element is parallel to the fourth one, the second element is parallel to the fifth one, and the third element is parallel to the sixth element. The claimed solution (Continued)

simplifies the assembly of three-dimensional objects and increases their reliability.

10 Claims, 3 Drawing Sheets

(51) Int. Cl.
*E04B 1/32* (2006.01)
*B29C 65/02* (2006.01)
*E04B 1/00* (2006.01)

(52) U.S. Cl.
CPC ............ *E04B 2001/0061* (2013.01); *E04B 2001/3276* (2013.01)

(56) References Cited

U.S. PATENT DOCUMENTS

| | | | |
|---|---|---|---|
| 2012/0151868 A1* | 6/2012 | Kang | E04C 5/06 52/649.1 |
| 2013/0276308 A1* | 10/2013 | Kang | E04C 2/3405 29/897 |
| 2016/0325520 A1* | 11/2016 | Berger | F16S 3/08 |

OTHER PUBLICATIONS

Written Opinion of the ISA for PCT/RU2018/000390 dated Feb. 7, 2019, 4 pages.

\* cited by examiner

METHOD OF OBTAINING PARALLEL-PERPENDICULAR SPHERICAL SYSTEM OF PLANES

This application is the U.S. national phase of International Application No. PCT/RU2018/000390 filed Jun. 9, 2018 which designated the U.S., the entire contents of which are hereby incorporated by reference.

FIELD OF THE INVENTION

The invention relates to methods for producing parallel-perpendicular spherical systems that can be used to assemble three-dimensional objects representing the intersection of several planes and can be used to assemble structures in engineering, construction or other arts.

BACKGROUND OF THE INVENTION

There is a known method for assembling three-dimensional objects is known, in the process of which planes are formed from two wire grids, wherein the first wires with spiral winding, which run parallel to each other through their axes, are twisted with each other in the x direction in such a way that the two adjacent wires are connected by the intersection point for each turn, and in the transverse direction relative to the axes of the first wires, the set of other spiral wires, which run parallel to each other through their axes, are twisted into the first wire grid of the first wires, and form a second plane of two wire grids, while an offset is performed in the z direction relative to the plane of the aforementioned wire grids, wherein a plurality of spiral third wires parallel to each other by means of their axes intersecting with each other are twisted, and the second wires of the plane, which are displaced perpendicular to them in such a way that every second of the second wires of the plane intersects and the first wire grid is formed in the second plane in the transverse direction relative to the axes of the third wires, wherein the set of spiral fourth wires parallel to each other through their axes is twisted and in order to form the second wire grid in the second plane, the said fourth wires intersect at their intersection points with each other and with the intersection points of the third wires of the second wire grid to form the intersection point (see RF Patent No. 2508175 published on Feb. 27, 2014 IPC B21F 27/12). The disadvantages of this solution are the complexity of assembling three-dimensional objects and the high material consumption and the inability to use materials other than wire; In addition, the three-dimensional object obtained by this method does not have the necessary rigidity. The claimed solution aims to remedy these disadvantages.

The technical result achieved when implementing the claimed method is to simplify the assembly of three-dimensional objects, as well as to increase the reliability of three-dimensional objects obtained by using it.

SUMMARY OF THE INVENTION

To eliminate the disadvantages of the prototype and to achieve the claimed technical result, a method was developed to obtain parallel-perpendicular spherical systems, which includes the following operations: a) selecting of at least six identical elements, b) determining of at least one connection point on the first element; c) determining of at least the connection point on the second element; d) connecting of elements at certain points of junction in such a way that the planes passing through the first element and the second element are perpendicular; e) selecting of the next element; f) determining of its points of intersection with previous elements; g) connecting of element with the previous elements at the intersection points in such a way that the planes passing through the elements are mutually perpendicular to the operation e)-g) doing as long as all the elements are installed in the three-dimensional object and wherein meeting of the condition that the first element is parallel to the fourth, the second element is parallel to the fifth one, and the third element is parallel to the sixth one.

Elements can be ring-shaped and made in the form of a flat circle or a square. Elements can be made of metal and be joined by welding. Elements can be made of polymer and bonded with glue. Elements can be made of composite material.

In addition, a three-dimensional object was claimed, which was obtained using the claimed method, comprising at least six intersecting planes.

DESCRIPTION OF THE DRAWINGS

The following figures clarify the claimed invention.

THE DETAILED DESCRIPTION OF THE INVENTION

The claimed method is implemented as follows: first, selecting of at least six identical elements, then, determining of at least one connection point on the first element; then, determining of at least the connection point on the second element; then, connecting of the elements at certain points of the junction in such a way that the planes passing through the first element and the second element are perpendicular; afterwards, selecting of the next element; determining of its points of intersection with previous elements; then, connecting of the element with the previous elements at the intersection points in such a way that the planes passing through the elements are mutually perpendicular to the following elements. To attach the remaining elements, the operations associated with determining the intersection points on the previous elements of the operation and attaching them to the already assembled structure are repeated until all the elements are installed in the three-dimensional object, wherein the condition is met that the first element is parallel to the fourth one, the second element is parallel to the fifth one, and the third element is parallel to the sixth one and each element is secured at two points. Experiments have shown that when doing method operations in this way, a three-dimensional object is obtained that has high strength properties due to the intersection of planes passing through the elements of the object at right angles. Besides, the very method of assembling such an object is quite simple, since it comprises a set of several repeated simple operations.

When implementing the method, elements of various shapes can be used depending on the field of application of the obtained three-dimensional object, for example, the element shape intended for assembling propellers for watercrafts can be a flat circular plate. In other cases, the elements may be ring-shaped, made in the form of a flat circle or a square. Wherein the material and method of connecting elements is also selected depending on the field of application of the three-dimensional object assembled by the claimed method. Therefore, elements can be made, for example, from metal and are joined by welding, or the elements can be made of polymer and be connected, for example, glued. Besides, elements can be made of composite material. Wherein each element of a three-dimensional object can be made of a material that is different from other elements.

Figure 1:
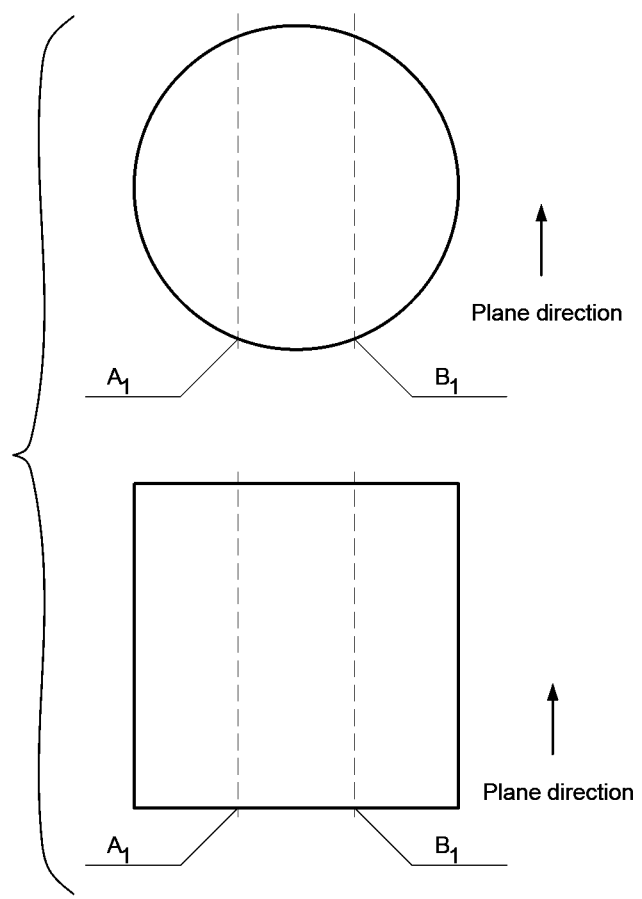
FIG. 1 shows an example of determining the intersection points of elements.
Figure 2:
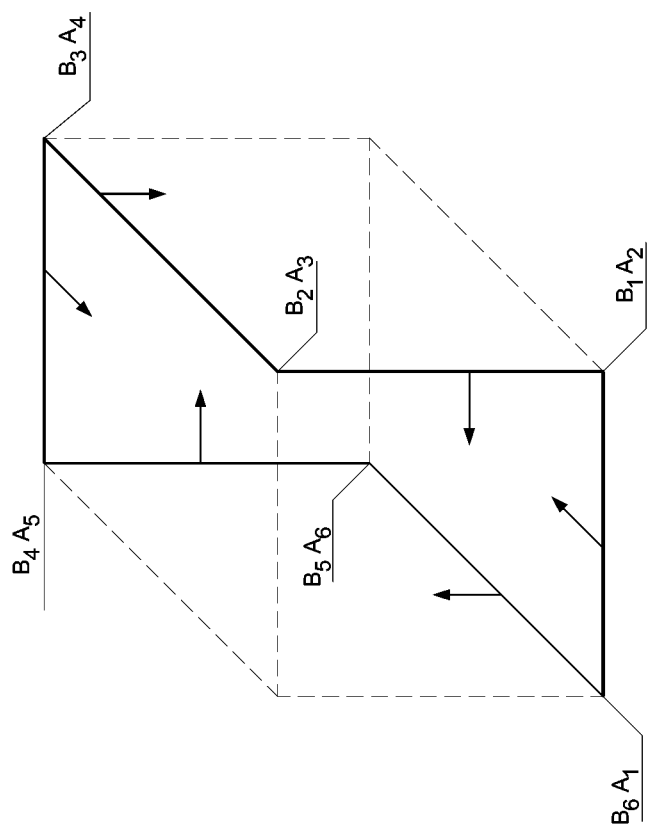
FIG. 2 shows the layout and connection points of elements.
Figure 3:
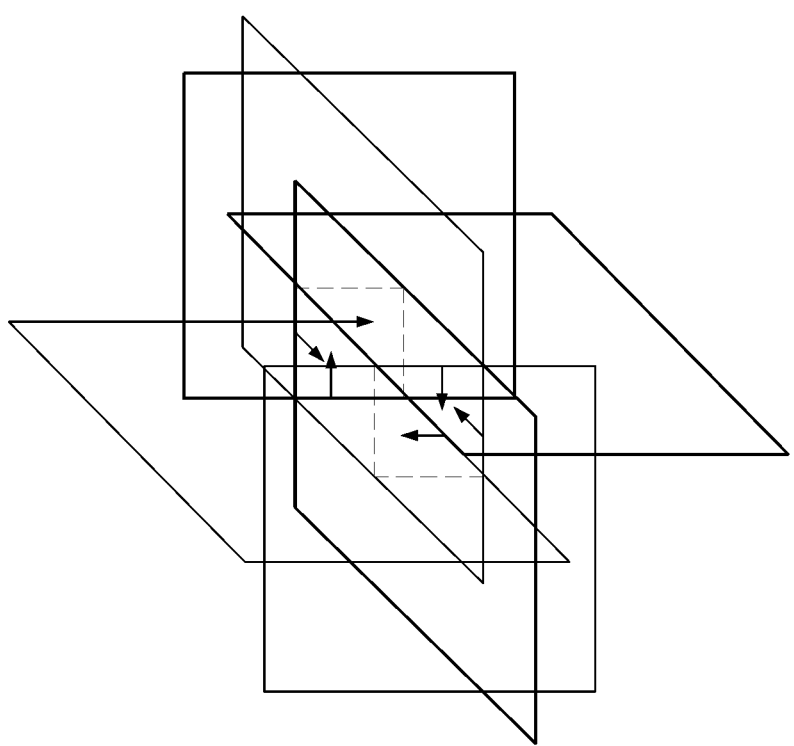
FIG. 3 shows the assembled in parallel-perpendicular spherical system of planes.

Let's consider one of the possible embodiments of the claimed method. Six elements are selected that represent a two-dimensional figure—a circle; each of them is divided into three parts, the areas of which are equal, wherein two parts are segments of the given circle. The division points of these parts are marked, see FIG. 1, and all 6 elements are connected in series (see FIG. 2) through the marked points so that the planes passing through the elements are perpendicular to each other, wherein the condition is met that the first element is parallel to the fourth one, the second element is parallel to the fifth one, and the third element is parallel to the sixth element (see FIG. 3), and each of the elements is connected at two points with other elements. According to a possible embodiment of the method, the elements are connected to make two individual groups of 3 elements each, which are further connected with each other at the marked points. In case more than six elements need to be connected, the sequence of actions of the method does not change, but additional elements are added in pairs and wherein the angle of connection between the planes at their connection point changes.

If two-dimensional figures are used as elements, it can be a circle, a square, and if three-dimensional figures are used as elements, then it can be a torus, cubic forms, triangular forms. Wherein it should be understood that the choice of the shape of a figure is determined by the scope of the obtained three-dimensional object rather than by the requirements of the operations of its production method.

To manufacture the elements, materials can be used, whose strength properties correspond to the field of application of the obtained three-dimensional object, such as metals, metal alloys, plastics, elastic materials.

The invention has been disclosed above with reference to a specific embodiment. To those skilled in the art, there are other embodiments of the invention may be obvious, which do not change its essence, as disclosed in this detailed description. Accordingly, the invention should be considered limited in scope only by the following claims.

The invention claimed is:

1. A method of obtaining parallel-perpendicular spherical systems, comprising the following operations:

a) selecting of at least six identical elements, each element representing a two-dimensional figure and each element having at least two connection points and a plane passing through each respective two-dimensional figure;

b) determining of at least one connection point on the first element;

c) determining of at least the connection point on the second element;

d) connecting of the first element and the second element at the connection point on the first element and the connection point on the second element in such a way that the planes passing through the first element and the second element are perpendicular;

e) selecting of the next element;

f) determining of at least one connection point on the next element forming a point of intersection between the next element and at least one of the previous elements;

g) connecting of the next element with the previous elements at the point of intersection in such a way that the planes passing through the next elements and at least one of the previous elements are mutually perpendicular to each other the operations e)-g) are performed for at least the third element, the fourth element, the fifth element, and the sixth element and wherein the condition shall be met that the planes passing through (i) the first element and the fourth element, (ii) the second element and the fifth element, and (iii) the third element and the sixth element are parallel, wherein edges of each two-dimensional figure are offset.

2. A method according to claim 1, wherein the shape of each element is a ring.

3. A method according to claim 1, wherein the shape of each element is a circle.

4. A method according to claim 1, wherein the shape of each element is a square.

5. A method according to claim 1, wherein elements are made of metal.

6. A method according to claim 5, wherein elements are connected by welding.

7. A method according to claim 1, wherein elements are made of polymer.

8. A method according to claim 7, wherein the elements are connected with glue.

9. A method according to claim 1 wherein elements are made of composite material.

10. A method according to claim 1 wherein each element has only two connecting points.

* * * * *